United States Patent [19]

Slagley et al.

[11] 4,133,373

[45] Jan. 9, 1979

[54] LEAK DETECTING APPARATUS

[75] Inventors: William E. Slagley, Crown Point; Peter K. Strangway, Munster, both of Ind.

[73] Assignee: Inland Steel Company, Chicago, Ill.

[21] Appl. No.: 823,959

[22] Filed: Aug. 12, 1977

[51] Int. Cl.² ............................................. G01M 3/08
[52] U.S. Cl. .................................. 165/11; 73/40.5 R; 137/557; 266/193
[58] Field of Search .......................... 165/11; 62/125; 266/193; 73/40.5 R; 137/551, 557

[56] References Cited

U.S. PATENT DOCUMENTS

| | | | |
|---|---|---|---|
| 1,474,071 | 11/1923 | Crowther | 73/40.5 R |
| 2,658,728 | 11/1953 | Evans | 165/11 X |
| 2,893,701 | 7/1959 | Bell | 165/11 |
| 2,984,991 | 5/1961 | Morgan | 165/11 X |

*Primary Examiner*—Edgar W. Geoghegan
*Attorney, Agent, or Firm*—Merriam, Marshall & Bicknell

[57] ABSTRACT

A cooling system for a vessel, such as a blast furnace, containing hot gas. The cooling system comprises a large number of cooling circuits each having one or more cooling members extending inwardly into the blast furnace walls. At the downstream end of each cooling circuit is a device which indicates when a cooling member in that circuit has a leak. Each leak detecting device comprises a container normally filled with water which is displaced from the container by gas from the blast furnace when there is a leak in a cooling member. The displacement of the water by the gas is visually displayed or generates a signal to indicate the occurrence of a leak.

8 Claims, 9 Drawing Figures

LEAK DETECTING APPARATUS

BACKGROUND OF THE INVENTION

The present invention relates generally to methods and apparatuses for detecting leaks in fluid-conducting systems, and more particularly, to the detection of leaks in water-conducting systems that are used for cooling or heating pressurized types of devices such as blast furnaces, boilers, heat exchangers, heat treating furnaces, etc.

In the case of a blast furnace, a typical structure has an exterior metal shell lined with a refractory interior. Tuyeres or nozzles, for introducing combustion-supporting air into the blast furnace, extend into the furnace interior at a lower portion thereof. Located above the tuyeres are portions of the furnace known as the bosh, belly and stack, and located below the tuyeres is a furnace portion known as the hearth. All of these portions of the blast furnace are cooled with cooling members extending inwardly through the furnace shell and connected to respective cooling circuits through which cooling water is pumped.

In large blast furnaces, the number of separate cooling circuits may range from 500 to 1000. Each individual cooling circuit has an upstream end and a downstream end and includes one or more cooling members, usually less than ten. The types of cooling members include tuyeres having built in cooling jackets, tuyere coolers surrounding the tuyeres, per se, and copper plates or staves or other cooling members in the bosh, belly, stack and hearth. Each cooling member has an inlet for the cooling liquid, connected to the upstream end of the cooling circuit, and an outlet for the cooling liquid, connected to the downstream end of the cooling circuit, either directly or via the inlet and outlet of a downstream cooling member in the same circuit.

Because of the high temperature and severe reaction conditions inside the blast furnace, cooling members frequently develop leaks. In conventional cooling systems, the fact that there is a leak somewhere in the system can usually be discerned when the leak occurs. However, to isolate the leak to the particular cooling circuit in which the leak is located, using conventional leak-locating techniques, is a long, tedious and cumbersome procedure when the cooling system contains several hundred cooling circuits, as is often the case in modern blast furnaces. Indeed, it may take up to two to three days to isolate the leak, using conventional procedures.

It is important to rapidly detect such leaks. Failure to do so may cause chilling of the furnace by the injection of large volumes of cooling water into the furnace from the cooling member when water in the leaky cooling member is at a pressure higher than the furnace internal gas pressure. When the water in the leaky cooling member is at a pressure lower than the furnace internal gas pressure, failure to rapidly detect a leak may cause the loss of large amounts of combustible blast furnace gas into the cooling circuit and then into the cast house (a part of the blast furnace complex), and this creates safety problems. In addition, blast furnace gas entering the cooling system could be drawn into the pumping system and damage the pumps, and either furnace gas leaking into, or steam generated in a cooling plate that has or is about to fail, respectively, would decrease the cooling effectiveness of the cooling liquid in downstream cooling members in the circuit and, hence, potentially cause the formation of a leak in one or more of these downstream members.

With respect to prior art leak detection devices, numerous types of flowmeters and associated instrumentation have been developed for measuring fluid flow. (These include orifice meters, turbine meters, vortex meters, magnetic flow meters, etc. Hence, it would be possible to place one of these devices on the inlet line of each cooling circuit and another one of these devices on the outlet line of that circuit and utilize the difference in flow rates detected by the two devices to determine if there is any leakage in the circuit between the inlet and outlet flowmeters.

However, these devices are relatively costly. In addition, they usually create an obstruction in the fluid line which not only causes an additional pressure drop but, also, can promote the buildup in that line of foreign solid particles which could ultimately block the circuit. Also, these devices usually require frequent calibration, and the flow rate difference between the inlet and outlet readings is usually not very accurate.

SUMMARY OF THE INVENTION

The present invention eliminates the need for high cost instrumentation, eliminates the need for placing any obstruction in the fluid flow lines and provides a leak detection device whose operability may be routinely and simply checked.

In accordance with the present invention, each of the cooling circuits is provided with a container connected by a coupling in fluid communication with the piping of the cooling circuit adjacent the downstream end of the cooling circuit. The container must be on the upper side of or above the downstream piping at the point where they are located, and, preferably, the container should be disposed at an elevation higher than any part of the cooling circuit. The container and the coupling cooperate with the cooling circuit to fill the interior of the container with cooling liquid in the absence of gas in the cooling circuit and to allow displacement of the cooling liquid from the container by gas when gas enters the cooling circuit. In addition, means are provided for displaying the displacement of the cooling liquid from the container by the gas.

A manual version, a remotely monitored automatic version or a combination manual but remotely monitored version of this invention can be used to achieve the desired ultimate results.

Other features and advantages are inherent in the method and apparatus claimed and disclosed or will become apparent to those skilled in the art from the following detailed description in conjunction with the accompanying diagrammatic drawing.

DETAILED DESCRIPTION

Figure 1:
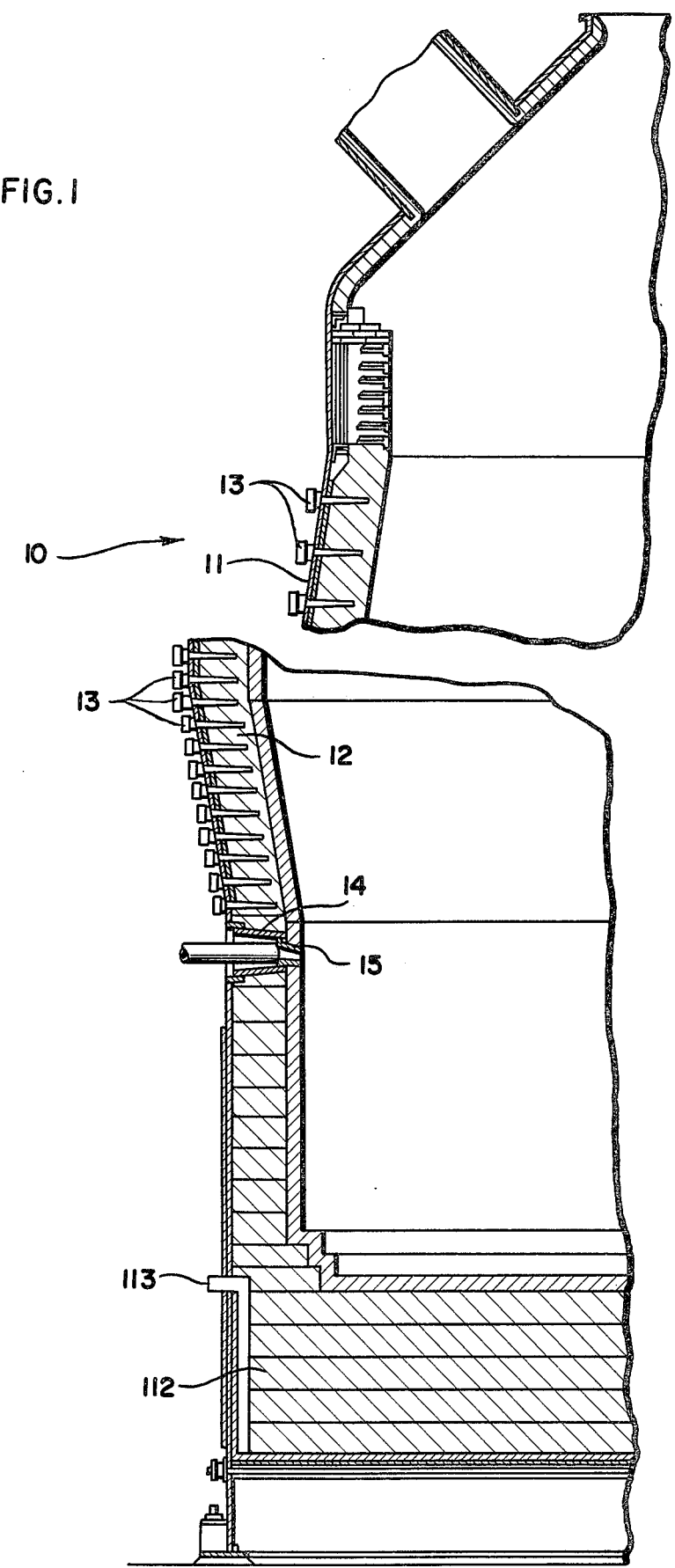
FIG. 1 is a fragmentary vertical sectional view of a blast furnace having cooling members with which an embodiment of the present invention may be used.

Referring initially to FIG. 1, indicated generally at 10 is a blast furnace comprising a shell 11 inside of which is a refractory lining 12. Embedded in refractory lining 12 are a multiplicity of cooling members or staves 13, and located around hearth 112 are hearth cooling members 113. Located at a lower portion of the blast furnace is a tuyere cooler 14 within which is housed a tuyere 15. Gas is introduced into the furnace through tuyere 15, and tuyere cooler 14 cools the refractory material around tuyere 15. All of tuyere 15, tuyere cooler 14 and cooling members 13 are water cooled.

Figure 4:
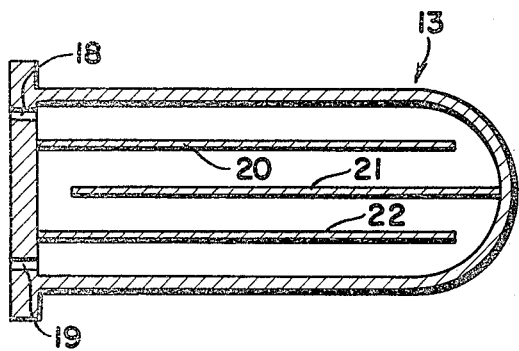
FIG. 4 is a sectional view of a cooling member for a blast furnace.

Referring to FIG. 4, cooling member 13, comprises an inlet 18, an outlet 19, and a plurality of interior dividers 20, 21, and 22 which cooperate to define a channel along which cooling water flows from inlet 18 to outlet 19.

Tuyere cooler 14 and tuyere 15 are provided with internal channels through which cooling water may be circulated. These are of conventional construction and are not shown in the drawing.

As shown in FIG. 1, blast furnace 10 is provided with a multiplicity of cooling members 13 at vertically spaced locations along the height of the blast furnace. At any given elevation of the blast furnace, the furnace is surrounded by a plurality of cooling members 13, the number depending upon the diameter of the blast furnace. At any given elevation, a plurality of cooling members 13 at that elevation are grouped together into a cooling circuit 25 (FIG. 3), and there may be one or more cooling circuits at any elevation of the blast furnace, depending upon the number of cooling members required to surround the blast furnace at that particular elevation.

Figure 2:
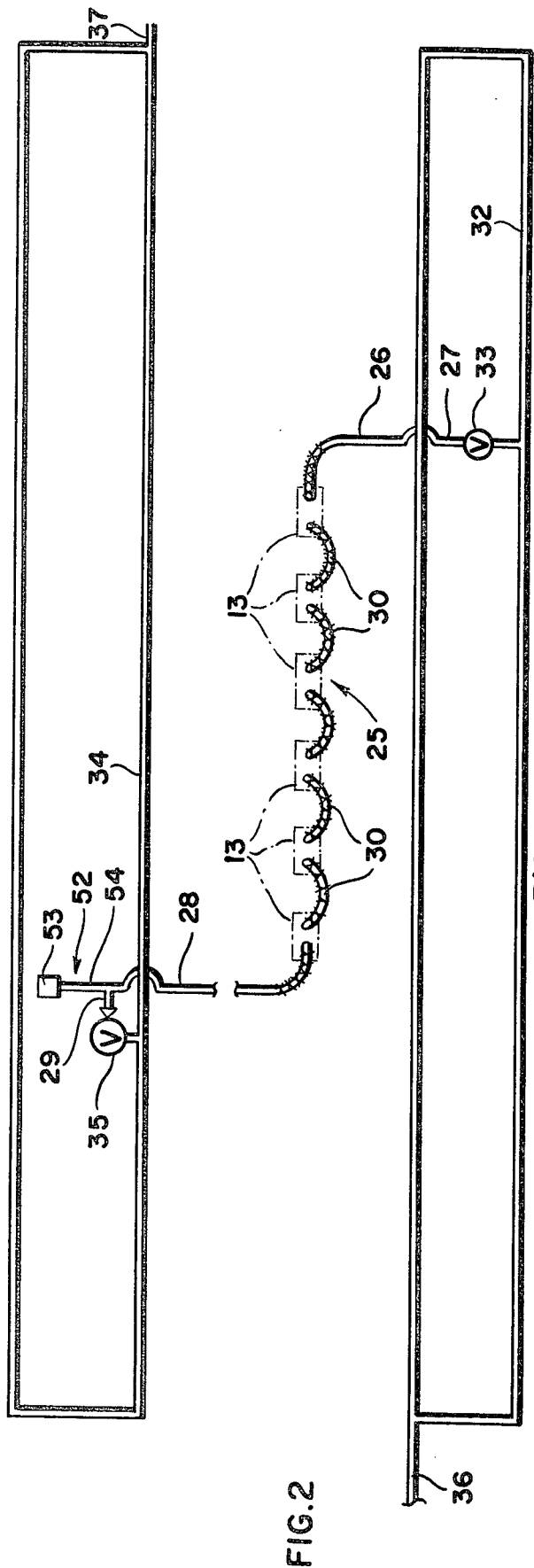
FIG. 2 is a schematic diagram of a cooling circuit incorporating a leak detector in accordance with the present invention.

Referring to FIG. 2, each cooling circuit 25 comprises, in addition to a plurality of cooling members 13, an upstream conduit 26 having an upstream end 27 and a downstream conduit 28 having a downstream end 29. The cooling members 13 in a circuit 25 are joined together by connecting conduits 30. The upstream end 27 of upstream conduit 26 is connected to a supply header 32 through a valve 33. The downstream end 29 of downstream conduit 28 is connected to a return header 34 through a valve 35.

Each supply header 32 and each return header 34 is connected to a large number of cooling circuits 25.

In a typical operation, cooling water is introduced into supply header 32 at 36 and is then circulated through cooling circuit 25 via valve 33 and upstream conduit 26. After passing through all of cooling members 13 and their connecting conduits 30, the cooling liquid is removed through downstream conduit 28 into return header 34, via valve 35, and is withdrawn from the return header at 37.

In a so-called "open" cooling system, cooling liquid typically is introduced into supply header 32 at 36 from a source such as a well, river or lake, or other storage means, and the cooling water withdrawn from return header 34 at 37 is dumped into a drain. In a so-called "closed" cooling system, the cooling water from the return header 34 typically is recycled for return through supply header 32. A "closed" cooling system is illustrated in FIG. 3.

Figure 3:
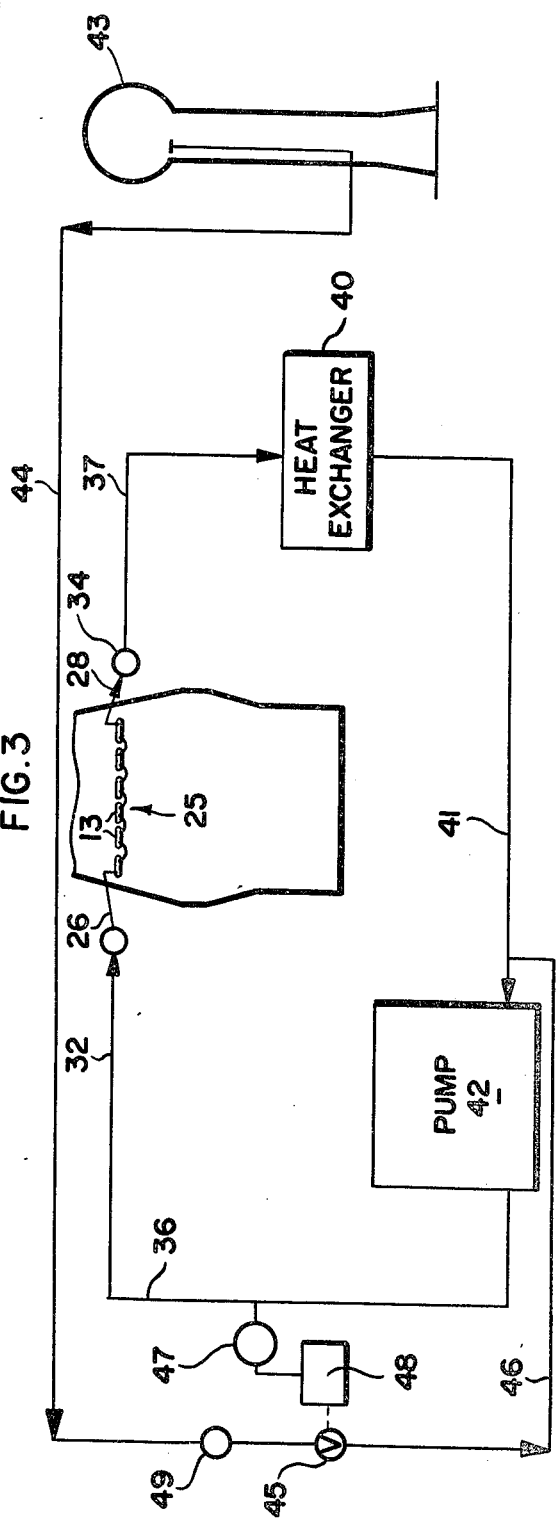
FIG. 3 is a schematic diagram of a cooling system for a blast furnace, utilizing an embodiment of the present invention.

Referring to FIG. 3, in a "closed" cooling system, cooling liquid withdrawn from return header 34 passes through line 37 into a heat exchanger 40 where the liquid is cooled, following which the liquid passes through a line 41 into a pump 42 which pumps the liquid through line 36 into supply header 32 from which the liquid returns to a cooling circuit 25. Because, in a closed system, there is some leakage of water at the pump seals of each pump 42, some makeup liquid must be provided. Accordingly, the closed system includes a reservoir such as a water tower 43, from which makeup liquid is supplied via a line 44 connecting through a valve 45 and another line 46 to pump 42.

The amount of makeup liquid supplied to the closed system is controlled by a system comprising a pressure sensor 47 which senses the decrease in water pressure in line 36 due to leakages at the seals of pump 42. Pressure sensor 47 actuates a controller 48 which opens or closes valve 45 in makeup lines 44, 46 to supply the correct amount of makeup water to pump 42 to restore the pressure in line 36.

A flow meter 49 continuously monitors the amount of makeup water passing through makeup line 44. Any surge at the flow meter, beyond the normal reading, reflects a leak in one of the many cooling circuits 25 supplied by the system. In order to determine which of the many cooling circuits is leaking, the system is provided with leak detectors in accordance with the present invention.

Referring to FIG. 2, indicated generally at 52 is a diagrammatic representation of a leak detector in accordance with an embodiment of the present invention. Leak detector 52 comprises a container 53 disposed at an elevation higher than any part of cooling circuit 25. A coupling 54 connects container 53 in fluid communication with cooling circuit 25 adjacent downstream end 29 of the cooling circuit. Container 53 is on the upper side of or above downstream piping 28, 29 at the point where the container is connected to the piping by coupling 54.

It is important that container 53 be on the upper side of or above the downstream piping at the point where it is located. This is to permit any gas entrained in the water to rise by gravity into the container where it can be detected. In the case of a cooling circuit with water circulating through the circuit at very low velocity, the entrained gas would tend to accumulate at the highest elevation in the cooling circuit. In this instance, it would be necessary to place container 53 at the highest elevation for it to function satisfactorily. However, at most typical blast furnaces, the water velocity in each cooling circuit is fast enough that any entrained gas from a leak will be carried through the circuit to the downstream piping, with the water. In these instances, it is only necessary to locate the container on the upper or high side of the downstream piping.

Container 53 and coupling 54 comprise means cooperating with cooling circuit 25 for filling the interior of container 53 and cooling liquid in the absence of gas in the cooling circuit 25 and for displacing the cooling liquid in container 53 with gas when gas enters cooling circuit 25. In addition, the detector 52 includes means for displaying the displacement of the cooling liquid in container 53 by the gas, when there is a leak.

In most cooling systems, the water pressure within cooling circuit 25 is lower than the pressure within blast furnace 10, and, in such a case, when there is a leak in the cooling circuit, the gas from the furnace leaks into cooling circuit 25.

In some instances, the water pressure within cooling circuit 25 exceeds the pressure within blast furnace 10. In such cases, when there is a leak within cooling circuit 25, the cooling liquid will leak into the furnace and leak detector 52, which depends upon the displacement of liquid in container 53 by gas from blast furnace 10, will not function absent a further manipulative step, as indicated below.

More specifically, when the monitoring of makeup liquid, at flow meter 49 (FIG. 3), indicates a sudden increase or surge of makeup liquid, the indication is noted by an operator, and the pressure in the entire cooling system is lowered by the operator, for about six or seven minutes. This is accomplished by first decreasing the superimposed pressure, and then cutting the flow rate of water through line 36, if necessary, until the water pressure in all the cooling circuits fed by line 36 is lower than the furnace pressure. When that happens, gas from within the furnace is forced, by the furnace pressure into whichever cooling circuit has the leak. When that occurs, the detector in the circuit having the leak will display or otherwise signal the fact that the cooling liquid in the container 53 of the detector 52 has been displaced by gas. Once that indication has been made, the water pressure in the system can be restored to its normal level, and each of the cooling members 13 within the circuit 25 at which the leak has been isolated may be individually manually checked to determine which cooling member 13 is leaking.

In an open cooling system, the amount of cooling water flowing through line 36 is monitored, and any sudden increase in the amount of water flowing through line 36 is indicative of a leak in one of the cooling circuits supplied by line 36. The same procedures for isolating the leak to a given cooling circuit and then to a given cooling member are followed as were described above in connection with a closed cooling system.

Once the leak has been isolated to a given cooling circuit 25, it takes about thirty minutes to then determine manually which of the six or seven cooling members typically in a circuit is leaking. With a leak indicator 52 on each of the cooling circuits, the particular cooling circuit which is leaking can be isolated relatively quickly, in any of the ways described below. Without such devices on each circuit, it may take up to two to three days to determine which cooling member is leaking, and this delay will permit too much water to leak into the furnace during the leak-locating period, when the pressure within the cooling system is greater than the furnace pressure, or the delay will permit too much gas to leak out of the furnace and into the atmosphere surrounding the furnace, when the pressure within the furnace exceeds the pressure within the cooling system. In either case, a delay of up to two to three days is excessive.

Various embodiments of leak detecting devices will now be described.

Figure 5:
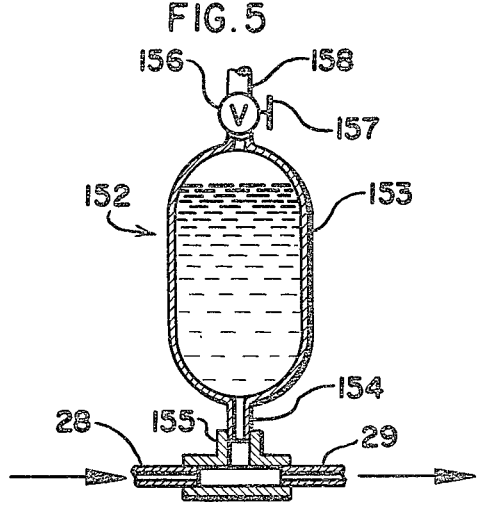
FIGS. 5-9 are sectional views of leak detectors in accordance with various embodiments of the present invention.

Referring initially to FIG. 5, indicated generally at 152 is a leak detector comprising a container 153 having transparent walls of glass or plastic. Container 153 is coupled to downstream end 29 of downstream conduit 28 by a tee fitting 155 and an inlet line 154 extending into the bottom of container 153. (In this embodiment, and in the embodiments of FIGS. 6-9, the downstream end of the downstream conduit is shown as a separate conduit portion.) Communicating with the top of container 153 is a manually operated valve 156 having a handle 157 and communicating with an outlet line 158.

Normally container 153 will remain filled with water, in the absence of a leak in the cooling circuit to which the container is connected. When a leaky cooling member in that circuit contains cooling water at a lower pressure than the gas pressure in the adjacent furnace portion, the gas leaking from the furnace into the cooling circuit will accumulate in transparent container 153, displacing the water therefrom. Hence, a man can regularly check the containers on each circuit for gas, and, if a container 153 is filled with gas, a leak in the corresponding circuit can be suspected. To doubly check for the leak, the man checking the transparent containers can immediately open valve 156 on the top of the container 153 filled with gas, bleed off the accumulated gas through outlet line 158, close the valve and wait to see if the transparent container immediately refills with gas. If it does, there is a leak in one of the cooling members in this circuit, and normal operating procedures would be followed to determine exactly which cooling unit within the circuit is defective. As a definite check for furnace gas, the man could try to ignite the gas as he bleeds it off.

When the cooling water in the leaking cooling member is at a higher pressure than the gas pressure in the adjacent furnace portion, the water pressure in the cooling circuits associated with the area where the leak is located must first be decreased for a few minutes to a pressure lower than the pressure within the furnace at the location of the leaky cooling member, until the particular cooling circuit in which the leaky cooling member is located is isolated. Once the pressure has been lowered to a level below that within the furnace, the same procedure is followed as is discussed above in connection with a system in which the water pressure in the leaky cooling member is lower than the gas pressure within the adjacent furnace portion.

Figure 6:
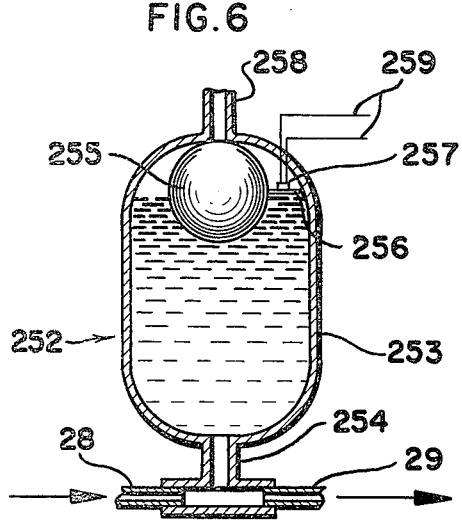

Referring to FIG. 6, indicated generally at 252 is a leak detector comprising a container 253 the bottom of which communicates with the downstream end 29 of downstream conduit 28 via a tee coupling 254. Located at the top of container 253 is an outlet line 258 normally closed by a ball float 255 carrying a switch-closing element 256 which normally engages and closes a switch 257 connected by wires 259 to a conventional signal detecting device or a conventional pulse counter (not shown).

When there is a gas leak in the circuit to which leak detector 252 is connected, gas will leak into container 253, displacing some of the liquid therein and causing ball float 255 to drop, thereby causing switch-closing element 256 to drop out of contact with switch 257, opening the switch and generating a signal or pulse which is detected on the associated signal detector or counted on the associated pulse counter, as the case may be.

When ball float 255 drops, the gas which has accumulated in the top of container 253 is permitted to escape through outlet line 258. If the gas escapes faster than the rate at which it accumulates in container 253, the water level in container 253 will rise causing ball float 255 to rise and eventually bring switch closing element 256 into contact with switch 257 and cause ball float 255 to close outlet line 258. When this occurs, the accumulation of gas within container 253 is repeated, and the cycle described above reoccurs. Each time ball float 255 drops or rises, switch 257 is opened or closed, and this causes a pulse to be counted or a signal to be generated. The pulses are recorded on a counter. If the recorded count for any given circuit is abnormally high, compared to the counts for other circuits, this indicates a leakage. The counters can be monitored visually by an operator or by a computer using conventional techniques.

Figure 7:
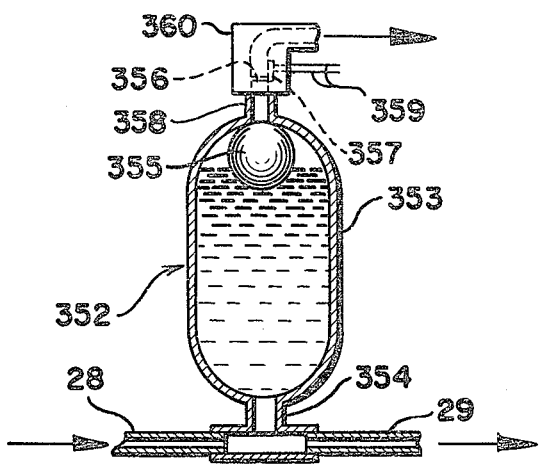

Referring to FIG. 7, indicated generally at 352 is a leak detector comprising a container 353 mounted at the downstream end 29 of downstream conduit 28 by a tee coupling 354. Extending upwardly from the top of container 353 is an outlet line 358 closed by a ball float 355.

When there is a leak in the associated cooling circuit, gas accumulates in container 353 displacing the liquid therefrom and causing ball float 355 to drop. This allows the gas to escape upwardly through outlet 358 into a vent valve 360 containing a flow switch comprising a pivoted, switch-closing flap 356, a switch 357 and wires 358 leading from switch 357 to a signal detector or pulse counter, as described above in connection with the embodiment of FIG. 6. Gas flow through vent valve 360 causes pivotable flap 356 to be pivoted into contact with switch 357, closing the switch and causing a signal to be detected at the signal detector or a pulse to be counted at the pulse counter.

If the rate of gas escape from container 353 exceeds the rate of gas accumulation in container 353, the water level will rise in the container causing ball float 355 to eventually close outlet line 358. This stops the escape of gas through vent valve 360, causing pivotable flap 356 to drop and opening switch 357. Further accumulation of gas in container 353 will repeat the cycle described above, causing additional detection of signals or additional counts on the pulse counter.

Figure 8:
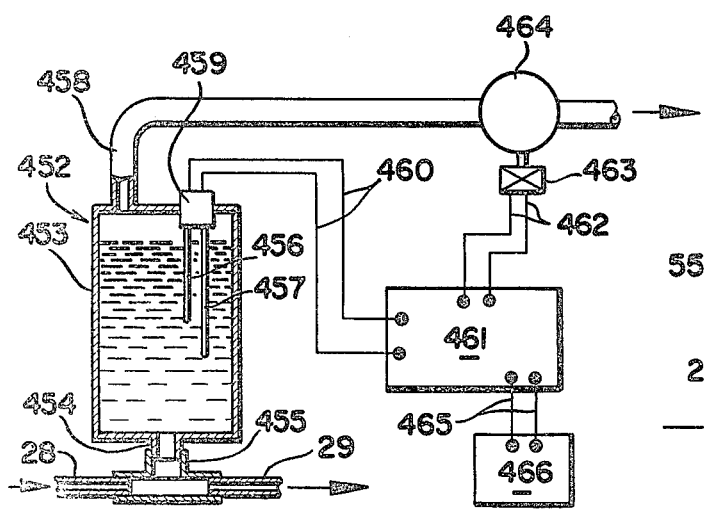

Referring to FIG. 8, indicated generally at 452 is a leak detector comprising a container 453 connected by an inlet line 454 and a tee fitting 455 to the downstream end 29 of downstream conduit 28. Extending downwardly at different depths into container 453 are a pair of probes 456, 457 on a water level detection device 459 connected by wires 460 to an electronic control system 461 of conventional construction.

When there is a leak in the circuit to which detector 453 is connected, gas accumulates within container 453 causing the water level to drop. When the water level drops below shorter probe 456, this is detected at detector device 459 which in turn communicates by wires 460 with electronic control system 461.

Water level detection device 459 is of conventional construction and has conductance-type probes 456, 457. Water level detection devices having capacitance-type probes or thermistor-type probes, both of which are conventional and commercially available, may also be utilized. All of these devices depend upon a change in the characteristics of an electrical circuit (i.e., a change in resistance or capacitance, or the opening or closing of a circuit, for example) for generating a signal. A thermistor-type probe undergoes a change in temperature as the water level changes, and this changes the resistance of the probe.

When a drop in the water level in container 453 is sensed at electronic control system 461, the control system actuates a valve control 463 connected by wires 462 to electronic control system 461. Valve control 463 opens a valve 464 on outlet line 458 permitting gas to escape from container 453. In addition, electronic control system 461 sends a signal through wires 465 to a signal detector or pulse counter 466, as described above in connection with the embodiments of FIGS. 6 and 7.

When the rate of gas escape through outlet line 458 exceeds the rate of gas accumulation in container 453, the water level in the container rises. This, in turn, is sensed by water level detection device 459 and by electronic control system 461 which causes controller 463 to close valve 464 thereby shutting off the escape of gas through outlet line 458. At the same time, the signal going to the signal detector or the pulse going to the pulse counter is stopped.

Figure 9:
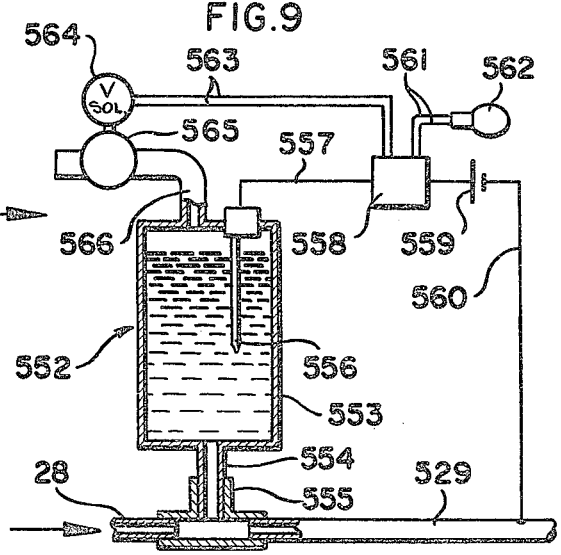

Referring to FIG. 9, indicated generally at 552 is a leak detector comprising a container 553 connected via an inlet line 554 and a tee fitting 555 to a downstream end portion 529 of a downstream conduit 28. Extending into container 553 is a conducting element 556 connected by a wire 557 to a switching device 558 of conventional construction. Switching device 558 is connected to a power source 559 (such as a battery) in turn connected by a wire 560 to the metal pipe constituting the downstream end portion 529 of the downstream conduit 28. Also connected to switching device 558 are wires 561 to which are connected a light bulb 562. Wires 563 extend from switching device 558 to a solenoid 564 controlling a solenoid valve 565 on an outlet line 566 at the top of container 553.

In the absence of a leak, conducting element 556 normally extends into a body of water in container 553, and there is a closed circuit through conducting element 556, wire 557, switching device 558, power source 559, wire 560, metal pipe 529 and the water between the connection of wire 560 on metal pipe 529 and conducting element 556. When there is leak in the circuit with which leak detector 552 is connected, gas accumulates within container 553 causing the water therein to drop. When the water level drops below the bottom of conducting element 556, this breaks the electrical circuit of which conducting element 556 is a part. This is sensed at switching device 558 which causes solenoid 564 to open solenoid-controlled valve 565 permitting gas within container 553 to escape through outlet line 566. In addition, light bulb 562 is caused to either turn off or turn on, depending upon the condition it was in before the water level in container 553 dropped below the bottom of conducting element 556.

When the water level in container 553 subsequently rises into contact with conducting element 556, this closes the circuit of which conducting element 556 is a part, and this, in turn, causes light bulb 562 to again turn on (or turn off as the case may be) and closes solenoid controlled valve 565.

The foregoing discussion refers to operation of the leak detector as involving the filling of the container with cooling liquid in the absence of gas. However, prior to start-up, all of the pipes, cooling members, etc., of a cooling system will be filled with air, and, when the system is first filled with water, the water is supposed to displace the air from the system. Because the leak detector container is designed to retain gas and because the water does not flush through it, the initial air entrapped in the container must be removed before the system becomes operational for detecting leaks. In the case of the automatic systems of FIGS. 7-9, the valves will open and permit the containers to fill with water. However, in the case of the manual system of FIG. 5 and the combination manually vented but remotely monitored systems (not shown), the air entrapped in the containers at the time of start-up of the system must be manually vented out of the containers by the operators in the same manner as they would vent out the gas in a container that detects a leak.

In all of the embodiments (FIGS. 5-9), the leak detector 152-552 may be provided with a conventional shut-off valve (not shown), on coupling line 154-554. The valve may be manually operable and similar to valve 156 on gas outlet line 158 in FIG. 5. During normal operation, the valve is left wide open, and it does not in any way obstruct fluid communication between the coupling and the container. Hence, accumulation of gas in the container is not obstructed in any way. However, if the leak detector becomes faulty and requires cleaning, repair or replacement, it is easy to close the valve below the container, correct the problem and then open the valve when the cleaned, repaired or new container has been put in place. The addition of the valve permits the above functions to be performed when the furnace and cooling system are in normal operation without disrupting the flow of water through the cooling circuit in any way.

As noted above, container 153 in leak detector 152 is composed of transparent material, such as glass or plastic because visual detection is the mode of detection utilized with this embodiment. However, when the leak detector utilizes other modes of detection, as in leak detectors 252-552 (FIGS. 6-9) the containers (253-553) need not be transparent and may be composed of opaque material, such as metal, or non-transparent plastic, so long as the container has sufficient strength and will contain water and gas.

With respect to the leak detector illustrated in the embodiments of FIGS. 6-8, the electrical switching device closes and opens during the period when gas is escaping from the leak detector. Simultaneously, a signal is sent to a pulse counter or to a computer which monitors the number of times that gas is released. When no cooling member is leaking, there will be some accumulation and release of gas. However, in the case of a leaking cooling member, the gas entering the circuit comprising cooling member will accumulate in the associated leak detector much more rapidly than in other, adjacent circuits and hence, provide much more frequent pulses to the pulse counter or to the computer input associated with this particular circuit. When the operator determines that a certain circuit is accumulating pulses at an abnormally high rate, the operator can then isolate this circuit from the rest of the cooling system (e.g., by closing valves 33 and 35) and use normal operating procedures to determine which cooling member in the circuit is leaking.

With respect to the embodiments of FIGS. 8 and 9, the automatically actuated gas release valves 464 (FIG. 8) and 564, 565 (FIG. 9) may be dispensed with. In such cases, after the opening or closing of the associated electrical circuit indicates to the monitoring device the presence of gas in the respective containers 453, 553, the gas can be released manually by a person opening a manually operated gas vent valve at the top of the respective container, as with valve 156 in FIG. 5.

In the case of furnaces where digital computer systems are available, the pulses or switch openings or closures can be communicated directly to the computer system. Then, using standard programming procedures, the digital computer can be programmed to monitor, on a frequent and routine basis, the accumulated pulses or the open/close status of the switch (e.g., 257 in FIG. 6). If the frequency of pulses or switch status changes for any given cooling circuit becomes abnormally high, the computer would immediately check that circuit for a leak.

As a result of dissolved gases in the water and gases from other equipment associated with the cooling circuits, it is possible that gas will normally slowly collect in the containers or air vent valves in the leak detectors 52 (FIG. 2). In the case of the manually inspected transparent container 153 (FIG. 5), a man should bleed the normally small amounts of accumulated gas out of these containers on a routine basis. If the normally expected amount of gas has not collected in the container or if more than the expected amount has accumulated, the man should check the leak detecting device to determine if it is plugged or leaking air — i.e., that it is functioning properly.

Similarly, in the case of the automatic systems, random, infrequent pulses or changes in status of the switch can be expected due to normal, slow gas build-up at the leak detectors. If these random pulses or changes of switch status are received frequently or are not received at all from a given cooling circuit, this circuit should be checked to determine if it is in operable condition.

A secondary and more positive technique for determining if the leak detecting devices are functioning properly would be to calibrate them at reasonable time intervals by inserting high pressure air or nitrogen into the outlet pipe 36 of each different pumping system (FIG. 3). This gas would mix with the water, pass through all of the cooling circuits associated with the particular pumping system and fill or partially fill all the containers or air vent valves, thus creating electrical pulses or counts or switch status changes. Any circuit that did not receive a reasonable amount of gas in the container of its leak detector or whose leak detector did not broadcast a reasonable number of pulses or changes of switch status should be checked as soon as possible because this device is probably not functioning properly. This procedure is much faster and simpler than the procedure associated with calibrating and checking most conventional flow monitoring devices.

The foregoing description discusses the cycling that will occur as gas intermittently escapes through a leak detector. That description is based on the premise that the gas escapes faster than the rate at which it accumulates in the container. In the case of a large leak, the gas may try to enter the container faster than it can escape through the container's outlet line or valve. In such a case, the valve or gas outlet line would remain open with gas passing through it continuously. Similarly, the switch or device that indicates that the container is full of gas would only change status once, when the gas first starts to be released. Continuous signals or pulses for the pulse counter would not be received. The pulse counter would only receive a single pulse, and valuable information would be lost.

If a system that continually monitored a change of switch status were used, such as a computer or the light bulb of FIG. 9, the constant new or reversed status of the signal would be monitored, and the fact that gas was continually escaping from the container would be detected and could be alarmed. However, the problem of gas accumulating in the container at a faster rate than it can escape from the container and, hence, giving only a single pulse or signal, can be readily avoided by providing the leak detector with a large enough gas outlet line so that gas can never accumulate in the container at a rate faster than it can escape.

It should be noted that in the case of closed-circuit, high-pressure cooling systems, decreasing the water pressure sufficiently to detect the leak can often be accomplished without significantly decreasing the water flow rate through the cooling circuits that are being checked.

More specifically, in any closed pumping system, there is a natural pressure distribution of the water which is dependent on the elevation of the water in the system relative to some reference level. This can be referred to as the water head or hydraulic head, and it is essentially due to the weight of water in the system exerting a force down on the water in the portion of the system at lower elevations. This component of the pressure throughout the system is based on the level or elevation where the pressure is measured. In addition, there is an imposed pressure distribution which is a function of the pumping system, the piping configuration and any components that would tend to obstruct water flow through the system. Finally, the cooling system can have additional water forced into it in order to superimpose a higher pressure throughout the overall system. The superimposing of a higher pressure on the system can be accomplished with a closed circuit cooling system and may be necessary to achieve the water pressures required in the cooling members in order to insure that the water pressure at this location in the system is higher than the furnace internal gas pressure at that elevation.

Decreasing the water pressure in a cooling circuit until it is below the internal furnace gas pressure in that region in order to detect a leak would be accomplished as follows. First, the superimposed pressure could be decreased, or removed entirely if necessary, to obtain the water pressure required at the cooling circuit being tested. Removal of the superimposed pressure would not result in any decrease in water flow rate to the cooling circuits.

If removal of the superimposed pressure was not sufficient to decrease the water pressure in the cooling circuit to a pressure below the internal furnace pressure, the imposed pressure due to the pumps, etc., could then be decreased by decreasing the flow rate in order to achieve the reduced pressure necessary in the circuit being tested for a leak. Hence, although it may be necessary to decrease or cut the flow of water in some instances to check for a leak, in many cases it may be sufficient to simply decrease the superimposed pressure without any decrease in water flow rate through the system or circuit being tested.

As noted above, the present invention provides a relatively simple, positive and inexpensive means of detecting leaks without the extensive time and effort required for calibration procedures. Also, because no obstructions are placed in the water inlet or outlet lines of a cooling circuit, there is nothing that could block the water flow in the circuit.

Also, with the present invention, the accumulation of gas in a leak detecting device at a more rapid rate than normal for a non-leaking circuit, but at a less rapid rate than for a leaking circuit, could signal the possibility of failure in the near future of a cooling member in that cooling circuit, due to steam build-up, or could indicate that the water cooling and treatment systems are not functioning correctly. In the latter case, build-up of gas in all of the circuits within a given area would be observed simultaneously rather than gas build-up within a single water cooling circuit.

The foregoing detailed description has been given for clearness of understanding only and no unnecessary limitations should be understood therefrom as modifications will be obvious to those skilled in the art.

What is claimed is:

1. A cooling system for a vessel containing hot gas, said cooling system comprising:
   a cooling circuit having an upstream end and a downstream end;
   said cooling circuit comprising at least one cooling member including means through which a cooling liquid may be circulated;
   said cooling member having an inlet for said cooling liquid connected to said upstream end of the cooling circuit and an outlet for the cooling liquid connected to said downstream end of the cooling circuit;
   a container;
   coupling means connecting said container in fluid communication with said cooling circuit adjacent said downstream end of the cooling circuit;
   said container being disposed at an elevation higher than that part of said cooling circuit to which the container is connected;
   said container and said coupling means comprising means cooperating with said cooling circuit for filling the interior of said container with cooling liquid in the absence of gas in said cooling circuit and for displacing the cooling liquid in said container with gas when gas enters said cooling circuit; and
   means for displaying the displacement of said cooling liquid from said container by said gas.

2. The cooling system of claim 1 wherein said displaying means comprises transparent wall means on said container.

3. The cooling system of claim 1 wherein said displaying means comprises means, actuable in response to the displacement of said cooling liquid by said gas, for generating a signal.

4. The cooling system of claim 3 wherein said signal generating means comprises means, responsive to the displacement of said cooling liquid by said gas, for releasing said gas from within said container.

5. The cooling system of claim 4 wherein said signal generating means further comprises means, responsive to the release of gas from said container, for generating a signal.

6. In combination with the cooling system of claim 3: means for counting each signal.

7. The cooling system of claim 3 wherein said signal generating means comprises:
   an electrical circuit including means for generating a signal in response to a change in the characteristics of said electrical circuit;
   a portion of said electrical circuit being located within the interior of said container; and
   means, within the interior of said container, for effecting a change in the characteristics of said electrical circuit in response to the displacement of said cooling liquid by said gas.

8. The cooling system of claim 1 wherein said container is disposed at an elevation higher than any part of said cooling circuit.

* * * * *